United States Patent
Mathues

[11] 3,858,457
[45] Jan. 7, 1975

[54] FOUR-BAR LINK VARIABLE RATIO BRAKE PEDAL MOUNT

[75] Inventor: Thomas P. Mathues, Dayton, Ohio
[73] Assignee: General Motors Corporation, Detroit, Mich.
[22] Filed: May 21, 1973
[21] Appl. No.: 362,496

[52] U.S. Cl. .................................. 74/512, 74/516
[51] Int. Cl. ............................................ G05g 1/14
[58] Field of Search ............ 74/512, 513, 516, 518, 74/469, 560, 478, 520

[56] References Cited
UNITED STATES PATENTS
2,706,020  4/1955  Freers et al...................... 74/516 X Primary Examiner—Samuel Scott
Assistant Examiner—Frank H. McKenzie, Jr.
Attorney, Agent, or Firm—D. D. McGraw

[57] ABSTRACT

A brake pedal is suspended on a fixed support by links so that the pedal, the links, and the fixed support provide a four-bar link system. The link pivot points and lengths are so positioned that the effective pedal ratio increases as the pedal is stroked in the brake apply direction.

2 Claims, 3 Drawing Figures

Patented Jan. 7, 1975     3,858,457

FOUR-BAR LINK VARIABLE RATIO BRAKE PEDAL MOUNT

The invention relates to a variable ratio brake pedal arrangement, and more particularly to one having a four-bar link arrangement, one bar or link of which is fixed. The initial pedal mechanical advantage is set at a low value by the geometry of the links and their pivots. As the pedal is depressed, the mechanical advantage is increased as the instant center of rotation moves. The instant center of rotation is determined by the intersection of lines passing through the pivot points on the two links connecting the pedal lever and the fixed support link. The output force is exerted through a push rod attached by a clevis to the pivot pin connecting one of the movable links to the pedal lever intermediate the pedal lever ends.

IN THE DRAWING

Figure 2:
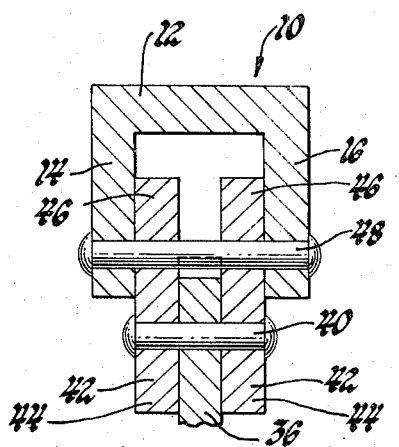
FIG. 2 is a cross-section view of a portion of the mechanism of FIG. 1 taken in the direction of arrows 2—2 of that FIG.

The brake pedal assembly 10 includes a mounting bracket 12 which is fixed to a suitable portion of a vehicle. The mounting bracket is channel-shaped in cross-section, as seen in FIG. 2, with the bracket sides 14 and 16 being in parallel spaced relation. The brake pedal lever 18 has a pedal 20 provided on the lower end thereof. A pivot pin 22 positioned in an intermediate portion of the lever 18 provides connection for the push rod 24 through the clevis 26. A link or bar 28 has one end 30 pivotally attached to pin 22 and the other end 32 pivotally attached to mounting bracket 12 by pivot pin 34. In the particular construction illustrated, link 28 is provided as two identical and parallel bars with the pedal lever 18 being received therebetween at pin 22. A suitable spacer which is the same thickness as the pedal lever 18 may be provided on pin 34 to maintain the link sections defining link 28 in parallel relation.

Pedal lever 18 extends generally toward mounting bracket 12 from pin 22, and this portion of the pedal lever provides lever link 36. The lever end 38 has a pivot pin 40 extending therethrough and pivotally connecting the sections forming link 42 and link 36 at that point. Link 42 is provided as two bars or sections similar to the arrangement of link 28. The lower end 44 of link 42 pivotally receives pin 40, with lever link 36 keeping the link sections in parallel spaced relation, as can best be seen in FIG. 2. The upper end 46 of link 42 is pivotally attached to mounting bracket 12 by pivot pin 48, which extends through the mounting bracket sides 14 and 16 as well as through the link sections forming link 42. This is best shown in FIG. 2.

The axes of the four pivot pins are in parallel relation, with the distance between pins 22 and 34 being substantially greater than the distance between pins 40 and 48. Line 50, extending through the axes of pins 22 and 34, intersects line 52, which extends through the axes of pins 40 and 48. As shown in the drawing, these lines are within the plane of movement of links 28 and 48, and intersect to define the instant center of rotation 54 of the brake pedal.

For purposes of ready identification of the elements of the invention as defined in the appended claims, the first, second, third, and fourth links are members 12, 28, 42 and 18, respectively. The first, second, third, and fourth pivot pins are members 34, 48, 22, and 40, respectively.

Figure 1:
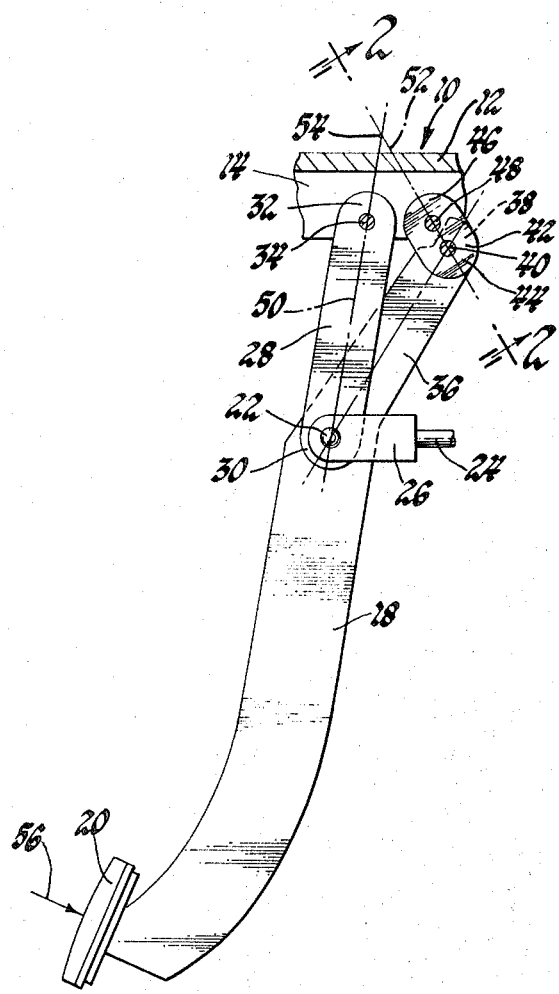
FIG. 1 is an elevation view of the pedal mount arrangement embodying the invention, with parts broken away and in section, and showing the pedal in the brake released position.
Figure 3:
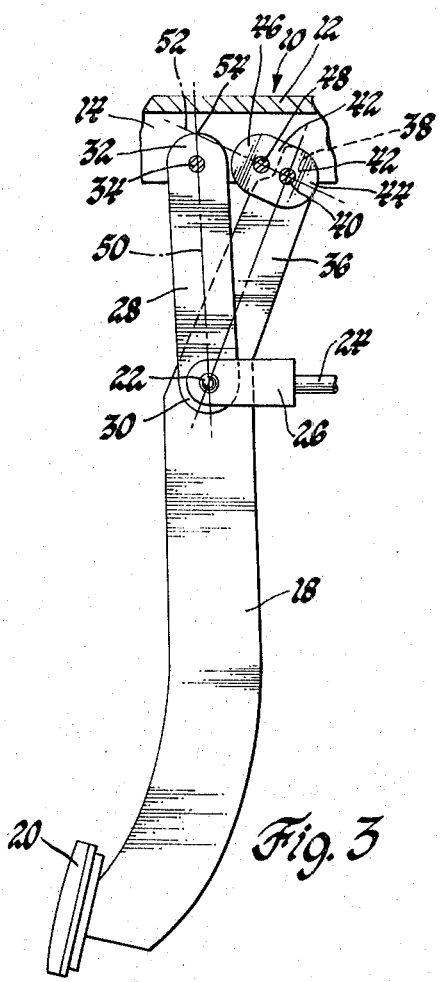
FIG. 3 is a view similar to FIG. 1 and showing the pedal in the brake applied position.

The mechanical advantage or ratio of the pedal assembly is determined by the distance from the point 56 of effective force application at brake pedal 20, this point being identified by arrow at point 56, to the axis of pin 22, plus the distance from pin 22 to the instant center of rotation 54, the sum being divided by the distance from pin 22 to the instant center of rotation 54. The change in mechanical ratio is determined by movement of the instant center of rotation 54 since the length from the pedal point 56 to pin 22 is fixed. As is shown in FIG. 1, when the assembly is in the released position, the instant center of rotation 54 is positioned at a greater distance from pin 22 than when the assembly is in the brake applied position shown in FIG. 3. This is determined by the geometry of the links and pins as described above, link 42 being considerably shorter than link 28 for this purpose. As the brake pedal is moved in the brake apply direction, the instant center of rotation approaches pin 22, decreasing the distance between pin 22 and point 54 and thereby increasing the mechanical advantage.

This arrangement provides a straightforward and effective brake pedal ratio changer which allows quick takeup of the brake system during initial brake apply movement and provides a high mechanical advantage during the latter portion of the brake apply stroke to give a greater brake effort without requiring commensurate greater brake apply force to be applied by the vehicle operator's foot.

The brake pedal mount is provided with lateral stiffness so that the movable links and the brake pedal move in parallel planes. This is accomplished by having the links in surface guiding relation at the pivot pins, links 28 and 42 being provided by two parallel bars receiving link 36 therebetween at pivot pins 22 and 40, and links 28 and 40 being received between the sides 14 and 16 of link 12. Due to the amount of surface engagement of links 28 and 40 with link 36, their bars are maintained in parallel relation. They may be reinforced in this regard with a suitable spacer having the same thickness as link 36 on pin 34 between the bars of link 28.

What is claimed is:

1. A variable ratio brake pedal mount comprising a four-bar link arrangement, said link arrangement including a fixed first link having first and second pivot pins extending transversely thereof in spaced axially parallel relation, a second link pivotally attached at one end to said first link by said first pivot pin and having a third pivot pin extending pivotally and transversely thereof at its other end in axially parallel relation to said first and second pivot pins, a third link pivotally attached at one end to said first link by said second pivot pin and having a fourth pivot pin extending pivotally and transversely thereof at its other end in axially parallel relation to said first and second and third pivot pins, a fourth link pivotally attached to said second and third links by said third and fourth pivot pins and extending beyond said third pivot pin in the opposite direction from said fourth pivot pin to define a brake pedal lever and having a brake pedal thereon at the end thereof opposite said fourth pivot pin, and a brake apply push rod pivotally attached to said third pivot pin, the line intersecting the axes of said first and third pivot pins and lying in the plane of pivotal movement of said second link and the line intersecting the axes of said second and fourth pivot pins and lying in the plane of pivotal movement of said third link intersecting at a point movable toward said third pivot pin at an increasing rate with movement of said brake pedal in the brake apply direction, said point being the instant center of rotation about which said brake pedal moves, thereby increasing the mechanical ratio of the mechanism during brake apply, the mechanical ratio being defined by the ratio of the distance from the brake pedal to said instant center of rotation relative to the distance from the axis of said third pivot pin to the said point of instant center of rotation.

2. The brake pedal mount of claim 1 in which said second and third links each comprise a pair of parallel bars, and said first link includes two parallel spaced sides, the ends of said second and third links respectively receiving said first and second pivot pins being between said first link sides in surface guiding relation, and the parts of said fourth link respectively receiving said third and fourth pivot pins being received between the ends of the parallel bars of said second and third links in surface guiding relation, said second and third and fourth links being guided in their movements into movement in parallel planes only and thereby maintaining lateral stiffness of said assembly.

* * * * *